Dec. 26, 1967  S. G. FORBES  3,359,733
ION ENGINE
Filed Oct. 11, 1965

Stuart G. Forbes,
INVENTOR
BY.
Alfons Valukonis
Agent

United States Patent Office
3,359,733
Patented Dec. 26, 1967

3,359,733
ION ENGINE
Stuart G. Forbes, Palos Verdes Estates, Calif., assignor to TRW Inc., Redondo Beach, Calif., a corporation of Ohio
Filed Oct. 11, 1965, Ser. No. 494,772
7 Claims. (Cl. 60—202)

ABSTRACT OF THE DISCLOSURE

Ion engine apparatus in which a source of liquid cesium under pressurized argon gas is connected through a signal controlled electromagnetic pump to a chamber having a tungsten wall permeable to cesium vapor to form an ion beam current. A heater positioned intermediate the pump and chamber serves to vaporize the cesium and to form a liquid-vapor interface and a thermal gradient region in the vicinity of the interface. Pressurization of the liquid cesium and signal control of the electromagnetic pump serve to regulate the feed rate of the cesium to the chamber and thereby the ion beam current evolving from the tungsten wall. The thermal gradient region provides automatic maintenance of equality of liquid and vapor pressures across the liquid-vapor surface. Accelerator electrodes positioned in the ion beam and energized with electrical potential provide acceleration to the ion beam.

Figure 1:
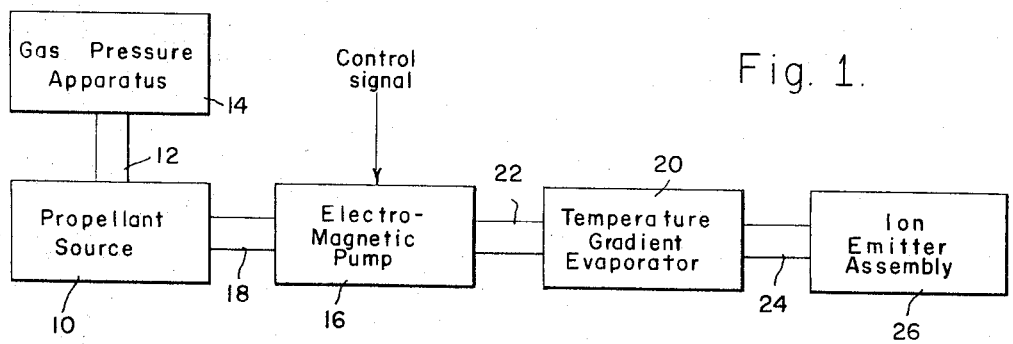

This invention relates generally to fluid flow control systems, and in particular to a system for controlling the flow of propellant fluids which supply ions in ion emitter assemblies such as an ion engine or the like.

In the operation of an ion engine it is required that the propellant to the engine be delivered in a vaporized state at low mass flow rates. This flow rate must be precisely controlled in order to coordinate the propellant delivery with the desired ion current in the engine.

Propellants for ion engines in most common use at the present are cesium and similar metals, which are stored in the liquid state, but are utilized in the engine in a vaporized state. The most common approach to produce this change in state is to employ a boiler containing the liquid metal heated to the appropriate temperature to produce the desired pressure of the propellant vapor. The liquid and vapor states are then separated by gravity.

The above system has distinct disadvantages. One of the most important disadvantages is that the entire propellant supply is heated to an elevated temperature which makes pressure control very slow.

Other prior systems depending on thermal valves for flow throttling are subject to similar control problems. The ambient temperature dependance of the thermal valves makes precise throttling control difficult to achieve. Still other systems utilize flow control by means of mechanical valves in the liquid line. These valves are awkward to operate and unreliable as flow controllers in fluid systems requiring a low flow rate.

Briefly, this invention concerns itself with the provision of a fluid flow control system wherein there is provided a thermal gradient vaporizer in the propellant line to maintain equilibrium between the vapor pressure and figured pressual so that liquid line pressurization can be used as a control means for the propellant feed rate to an ion engine. The thermal gradient vaporizer is utilized as a pressure equalizer for delivery of cesium vapor to the plenum chamber of an ion engine at the pressure required to produce the desired ion beam current. The desired pressure is predetermined externally and is applied to the liquid portion of the feed system. Equality between liquid and vapor pressure is automatically maintained by displacement of the liquid-vapor interface by means of a thermal gradient region established in the vaporizer. A heater element on the vaporizer is utilized to vaporize the cesium propellant and to establish the thermal gradient region. Provision is also made for connecting the vaporizer to an external reservoir containing liquid cesium. Pressurization is applied to the liquid cesium by means of a gas pressurization system employing an argon atmosphere and an electromagnetic pump to bring the liquid cesium into the vaporizer.

The utilization of pressure control rather than metering of extremely small mass flow rates enhances the simplicity of the system. The system is operable in either an inverted or in a zero-g environment. The surface tension at the interface is sufficient to prevent droplet separation in the inverted position. In the zero-g condition the only requirement is the ability to maintain the fluid line completely filled with liquid.

Accordingly, it is an object of this invention to overcome the foregoing disadvantages of prior systems and provide an improved system for controlling the flow of fluids.

Another object of this invention is to provide a fluid flow control system incorporating apparatus for maintaining equilibrium between the vapor pressure and the liquid pressure in the system so that liquid line pressurization can be used as a control means for the vapor feed rate.

One other object of this invention is the provision of a fluid flow control system wherein the fluid is externally stored at low temperature.

Still another object of this invention is the provision of a control system wherein a minimum amount of high temperature fluid is utilized thereby reducing the corrosion and contamination of the system.

Still another object of the invention is the provision of a fluid flow control system having a virtually instantaneous control of the fluid feed rate.

One other object of this invention is the provision of a fluid flow control system which can be utilized in a zero-g environment.

These and other objects and features of the invention may be more fully appreciated upon consideration of the following drawing and specification wherein:
FIG. 1 is a block diagram showing of the invention as applied to an ion emitter assembly arranged in accordance with the teachings of this invention; and
FIG. 2 is a schematic diagram of the details of the invention of FIG. 1.

Referring to FIG. 1 wherein there is shown a preferred embodiment of the invention as comprising a propellant source 10 connected by means of a conduit 12 to a gas pressure apparatus 14. The numeral 16 designates an electromagnetic pump having its input end connected by means of conduit 18 to the propellant source 10 and its output end connected to a temperature gradient evaporator 20 by means of the conduit 22. A conduit 24 connects the temperature gradient evaporator 20 with an ion emitter assembly 26.

Figure 2:
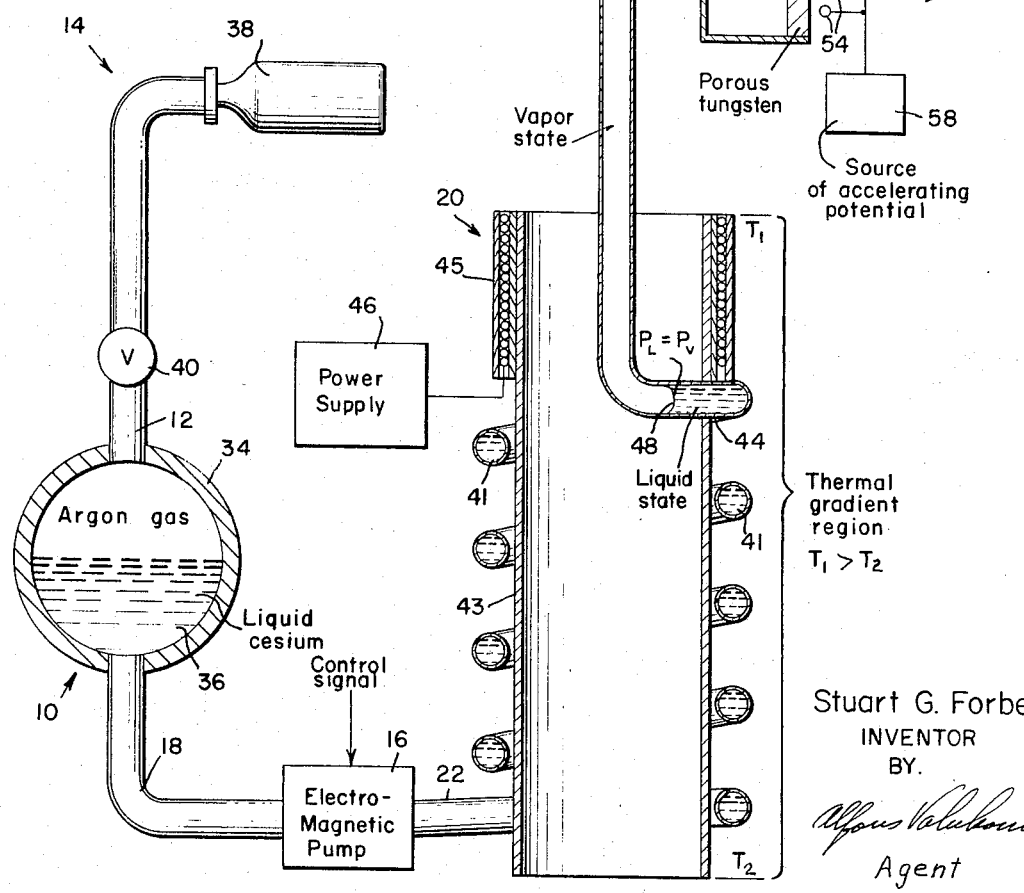

Referring to FIG. 2 the propellant source 10 is shown as including a container or reservoir 34 for containing ionizable fluid, preferably cesium 36, or the like. The container 34 is adapted to be maintained at a temperature of substantially 40° C. to maintain the cesium in a molten or liquid state.

The gas pressure apparatus 14 consists of a source 38 that is preferably adapted to contain argon gas, or the like, under pressure, for the purpose of supplying desired pressurization of the liquid cesuim by means of pressure regulating valve 40 through conduit 12.

The electromagnetic pump 16, which has its input connected to the container 34 by means of conduit 18, can be a simple conduction type motor in which an electrical current is adapted to flow through the liquid, in this instance the liquid cesium 36, at right angles to the fluid path defined by the conduits 18 and 22 in the presence of a transverse magnetic field. The pump 16 could be one controllable by an input control signal in either the forward or reverse mode to add to or to subtract pressure from the predetermined pressure provided by the gas pressurization apparatus 14.

The temperature gradient vaporizer 20 consists of an arrangement of a plurality of helical loops of conduit 41, suitably fastened as by welding to a stainless steel hollow core member 43, with an upstream end connected to the conduit 22 and a downstream end connected to the conduit 24 through a suitable opening 44 in the wall of the core 43. A heater assembly 45 is suitably mounted on the upper end of the core 43 and is adapted to be supplied with electrical power from a power supply 46 to raise the temperature of the temperature gradient vaporizer 20 to establish a thermal gradient region along the core 43 and the helical loops 41, such that vaporization of the cesium 36 is obtained and maintained to form a liquid-vapor interface 48 in the helical loops 41. The heater assembly 45 is so adjusted as to establish the thermal gradient region wherein the temperature $T_1$ of the upper portion of the vaporizer 20 is greater than the temperature $T_2$ of its lower end. As an example, the upper end of the core 43 can be raised to a temperature $T_1$ in the vicinity of 500° C. and the lower end can be maintained at a temperature $T_2$ of 300° C. as by suitable means (not shown) which can cool it by radiation and conduction.

The ion emitter assembly 26 has a porous tungsten element 50 that forms a vapor plenum chamber 52 in conjunction with the walls of the emitter assembly, the chamber 52 being connected to the conduit 24 for the acceptance of cesium 36 in its vapor state under pressure. Accelerator electrodes 54 are suitably positioned, as shown, to accelerate the ion beam 56 and are supplied by an appropriate electrical accelerating potential from a potential source 58.

In operation, the power supply 46 is caused to provide electrical energy in sufficient amount to the heater 45 to raise the temperature of the upper end of the thermal gradient vaporizer 20 to approximately 500° C., as hereinbefore set forth, while the lower end of the vaporizer is maintained at approximately 300° C. Vaporization of the liquid cesium 36 accordingly takes place to form a liquid vapor interface within the helical loops, as shown at interface 48. Since the conduit 24 leads into the ion engine vapor plenum chamber 52, the vaporized cesium will become distributed at the surface of the porous tungsten ionizer 50, with the molecules of the vaporized cesium diffusing through the porous tungsten element 50 and becoming positively ionized by contact ionization. Since the rate of flow of vaporized molecules of cesium to the exterior surface of the tungsten element 50 is determined by the cesium vapor pressure in the plenum chamber 52 and the transmissivity of the tungsten ionized element 50, which is relatively constant, flow rate of the molecules can be controlled by controlling the cesium vapor pressure in the plenum chamber 52.

This control can be readily achieved through liquid line pressure control. To this end liquid line pressurization is established by means of the gas pressure apparatus 14 and the electromagnetic pump 16. In the gas pressure apparatus 14, the argon gas in container 38 is applied under pressure to the container 34 by means of the valve regulator 40 in such amount as to cause the liquid cesium pressure in the system to be some selected arbitrary value, for example, it could be in an amount sufficient to produce a portion of the desired ionized cesium beam 56 intensity.

The electromagnetic pump 16 in turn is actuated by an appropriate control signal to provide the additional pressure needed to establish the rest of the desired intensity of the beam 56.

Because of the established thermal gradient in the temperature gradient vaporizer 20, wherein $T_1$ is greater than $T_2$, the pressure balance or equilibrium between $(P_L)$ and $(P_V)$ is maintained against disturbances in the system tending to shift the position of interface 48. If the liquid cesium rises too close to the temperature region $T_1$, the cesium vapor pressure increases due to the increased temperature in the conduit path. This increased pressure in the cesium vapor causes forcing back of the liquid-vapor interface 48 to the established equilibrium position. Similarly, when the interface 48 level is too close to the temperature region $T_2$, the liquid pressure forces the interface back toward equilibrium.

Although the invention has been described with reference to a particular embodiment thereof, it is to be appreciated that many modifications are possible without departing from the scope and spirit of the invention.

The embodiments of the invention in which an exclusive property or privilege is claimed are defined as follows:

1. Apparatus for maintaining liquid vapor interface pressure equilibrium in a fluid flow control system comprising:
   means defining a flow path having an upstream portion and a downstream portion, said upstream portion being adapted for connection to a source of fliud being subjected to a predetermined pressure to control flow of the fluid along the flow path, and
   means entirely surrounding said flow path defining means for subjecting said downstream portion to a higher temperature than the temperature at said upstream portion to vaporize said fluid to form a fluid vapor interface and to maintain pressure equilibrium across said interface.

2. Apparatus for maintaining liquid vapor interface pressure equilibrium in a system for supplying vapor at a predetermined pressure comprising:
   means defining a spiral flow path having an upstream portion and a downstream portion,
   said upstream portion being adapted for connection to a source of fluid being subjected to a predetermined pressure to control flow of the fluid along the flow path,
   a heat conductive core within said spiral flow path, and
   means for heating said core at said downstream portion of said path to a predetermined temperature higher than the temperature at said upstream portion to vaporize said fluid to form a fluid vapor interface and to maintain pressure equilibrium across said interface.

3. Apparatus as set forth in claim 2 wherein said flow path and core are metallic and said heating means comprises:
   an electrically operated heater surrounding said core.

4. Apparatus for maintaining liquid vapor interface pressure equilibrium in a system for supplying vapor at a predetermined pressure comprising:
   means defining a flow path having a plurality of helical loops, an upstream portion and a downstream portion, said upstream portion being adapted for connection to a source of liquid cesium being subjected to a predetermined pressure to control flow of the liquid cesium along the flow path,
   a stainless steel core within said helical loops, and
   an electrically operated heater surrounding said core at said downstream portion and capable of heating said core at said downstream portion to a temperature of substantially 500° C., whereby said liquid cesium is vaporized to form a liquid vapor interface with pressure equilibrium across the interface.

5. An ion source comprising:

a chamber having a wall of metal permeable to a metal to be ionized, a source for providing said metal to be ionized in liquid form, means interconnecting said chamber and said source to define a flow path for said liquid metal, means for applying a predetermined pressure to said liquid metal to control flow of said liquid metal along said path, and means entirely surrounding said interconnecting means for establishing a temperature gradient region along a portion of said path to vaporize said liquid metal to form a liquid vapor interface and to maintain pressure equilibrium across said interface.

6. An ion engine comprising:

a chamber having a wall of metal permeable to a metal to be ionized, a source for providing said metal to be ionized in liquid form, means interconnecting said chamber and said source to define a flow path for said liquid metal, means for applying a predetermined pressure to said liquid metal to control flow of said metal along said path, means for establishing a temperature gradient region along a portion of said path to vaporize said liquid metal to form a liquid vapor interface and to maintain pressure equilibrium across said interface, and means for establishing an electric field in the region of said wall to accelerate ions leaving said wall.

7. An ion engine as set forth in claim 6 wherein said predetermined pressure applying means comprises:

a source of regulated gas pressure, and electromagnetic pump means in said flow path adapted to be actuated by a control signal.

References Cited

UNITED STATES PATENTS

| | | | |
|---|---|---|---|
| Re. 16,935 | 4/1928 | Noll | 219—286 |
| 2,277,291 | 3/1942 | Blair | 219—272 |
| 3,187,160 | 6/1965 | Williams | 219—286 |
| 3,263,415 | 8/1966 | Sutherland et al. | 60—202 |
| 3,279,176 | 10/1966 | Boden | 60—202 |

CARLTON R. CROYLE, *Primary Examiner.*